(12) United States Patent
Emrich et al.

(10) Patent No.: US 9,927,180 B2
(45) Date of Patent: Mar. 27, 2018

(54) HEAT EXCHANGER AND METHOD FOR PRODUCING A HEAT EXCHANGER

(71) Applicant: MAHLE International GmbH, Stuttgart (DE)

(72) Inventors: Karsten Emrich, Stuttgart (DE); Matthias Schuele, Tamm (DE); Bernd Kraemer, Schwieberdingen (DE); Albrecht Siegel, Ludwigsburg (DE); Gaelle Schmidgall, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 25 days.

(21) Appl. No.: 15/094,191

(22) Filed: Apr. 8, 2016

(65) Prior Publication Data

US 2016/0223263 A1  Aug. 4, 2016

Related U.S. Application Data

(63) Continuation of application No. PCT/EP2014/073157, filed on Oct. 28, 2014.

(30) Foreign Application Priority Data

Oct. 29, 2013  (DE) .................. 10 2013 221 932

(51) Int. Cl.
*F28F 9/02*  (2006.01)
*F28D 1/02*  (2006.01)
(Continued)

(52) U.S. Cl.
CPC ............ *F28D 1/0233* (2013.01); *B23P 15/26* (2013.01); *F02M 26/11* (2016.02); *F02M 26/32* (2016.02);
(Continued)

(58) Field of Classification Search
CPC .. F28D 1/0233; F28D 1/05333; F28D 7/1653; F28D 7/1654; F28D 21/0003;
(Continued)

(56) References Cited

U.S. PATENT DOCUMENTS 4,407,268 A * 10/1983 Jardin ..................... F24J 2/34
126/400
4,930,483 A * 6/1990 Jones .................... F02M 27/02
123/538

(Continued)

FOREIGN PATENT DOCUMENTS

DE        600 04 919 T2   7/2004
DE  10 2007 031 419 A1    1/2008
(Continued)

*Primary Examiner* — Davis Hwu
(74) *Attorney, Agent, or Firm* — Muncy, Geissler, Olds & Lowe, P.C.

(57) ABSTRACT

A heat exchanger is provided that includes a housing and an exchanger region which is arranged in the housing and has tubes and at least one base, wherein the tubes are connected to the at least one base, wherein the housing is manufactured from a plastic and has a housing inner surface, wherein the housing inner surface is covered at least in regions or in sections by at least one metallic element for protecting the housing from a thermal load. The invention further relates to a method for producing a heat exchanger.

18 Claims, 3 Drawing Sheets

(51) Int. Cl.
*F28F 9/18* (2006.01)
*F28F 21/06* (2006.01)
*F28F 21/08* (2006.01)
*F28D 7/16* (2006.01)
*F02M 26/11* (2016.01)
*F02M 26/32* (2016.01)
*B23P 15/26* (2006.01)
*F28D 1/053* (2006.01)
*F28D 21/00* (2006.01)

(52) U.S. Cl.
CPC ....... *F28D 1/05333* (2013.01); *F28D 7/1653* (2013.01); *F28D 7/1684* (2013.01); *F28F 9/0219* (2013.01); *F28F 9/18* (2013.01); *F28F 21/067* (2013.01); *F28F 21/081* (2013.01); *F28F 21/089* (2013.01); *F28D 21/0003* (2013.01); *F28D 2021/008* (2013.01); *F28F 2255/146* (2013.01); *F28F 2265/02* (2013.01); *F28F 2265/10* (2013.01); *F28F 2275/067* (2013.01)

(58) Field of Classification Search
CPC ....... F02M 26/11; F02M 26/32; F28F 9/0219; F28F 9/18; F28F 21/067; F28F 21/081; F28F 21/089; B23P 15/26

USPC ....................................................... 165/175
See application file for complete search history.

(56) References Cited

U.S. PATENT DOCUMENTS

| 6,311,678 | B1 | 11/2001 | Lepoutre |
| 2009/0200003 | A1* | 8/2009 | Digele ................ F01N 5/02 165/158 |
| 2010/0200203 | A1* | 8/2010 | Postma ................ F28D 7/0041 165/177 |
| 2012/0305220 | A1 | 12/2012 | Sauter et al. |
| 2014/0216385 | A1 | 8/2014 | Bruggesser et al. |

FOREIGN PATENT DOCUMENTS

| DE | 10 2008 062 705 A1 | 6/2010 |
| DE | 10 2009 016 317 A1 | 10/2010 |
| DE | 10 2009 025 282 A1 | 12/2010 |
| DE | 10 2009 050 884 A1 | 4/2011 |
| DE | 10 2013 008 773 A1 | 11/2014 |
| EP | 2 110 538 A1 | 10/2009 |
| EP | 2 765 286 A1 | 8/2014 |
| FR | 2 931 900 A1 | 12/2009 |

* cited by examiner

HEAT EXCHANGER AND METHOD FOR PRODUCING A HEAT EXCHANGER

This nonprovisional application is a continuation of International Application No. PCT/EP2014/073157, which was filed on Oct. 28, 2014, and which claims priority to German Patent Application No. 10 2013 221 932.6, which was filed in Germany on Oct. 29, 2013, and which are both herein incorporated by reference.

BACKGROUND OF THE INVENTION

Field of the Invention

The invention relates to a heat exchanger, in particular for a motor vehicle and a motor vehicle with a heat exchanger. The invention also relates to a method for producing a heat exchanger.

Description of the Background Art

In a heat exchanger, which can also be referred to as a heat transfer unit, thermal energy can be transferred from one material flow to another. In a motor vehicle, different embodiments of heat exchangers are used, in particular i-flow heat exchangers and u-flow heat exchangers. The heat exchangers should be as light as possible in order to reduce the total weight in the vehicle. Preferably, the heat exchangers are at least in part or in places manufactured from a lightweight material, in particular from a plastic. Currently, only u-flow heat exchangers with a plastic housing are on the market and in use in motor vehicles. For manufacturing reasons, the i-flow heat exchangers are currently manufactured from metallic materials, in particular steel or cast aluminum.

DE 10 2009 050 884 A1, which corresponds to US 2012/0305220 and which is incorporated herein by reference, disclose an exhaust gas heat exchanger in particular for a motor vehicle, comprising at least a diffuser for supplying and/or discharging an exhaust gas stream, a transfer portion with axially extending exchanger tubes, the exchanger tubes being connected at one end with a base. Further, the exhaust gas heat exchanger comprises a housing than can be flowed through by a refrigerant, which is formed of a non high-temperature resistant material, in particular plastic or aluminum, wherein a connecting element is partially embedded in the housing to secure the connecting element to the housing. The connecting element is connected in a first adhesive bond area cohesively with the base, which is connected to a second adhesive bond area cohesively with the diffuser.

SUMMARY OF THE INVENTION

It is therefore an object of the invention to provide an improved heat exchanger which has a low weight.

In an exemplary embodiment, a heat exchanger comprises a housing and an exchange region having tubes and at least one base disposed in the housing, the tubes being connected at one end of the tube with the at least one base, wherein the housing can be made of a plastic and has a housing inner surface, the inner surface of the housing being at least in parts or sections covered with at least one metallic element to protect the housing from a thermal load. The thermal load can hereby be caused by a joining process, in particular by laser welding. As a result, the metallic element, which at least partially covers the inner surface of the housing, can protect the housing from being damaged by the thermal load.

The metallic element can be disposed in the housing, starting from an edge area of the inner surface of said housing, which at least partially covers the inner surface of the housing.

The heat exchanger can have two bases, the tube end being a first tube end and the tube having a second tube end, which is connected to a second base. Thus, the tubes of the exchanger region are connected to the first base and the second base, form a tube/base package and are arranged in an assembled state within the housing.

The tubes can be arranged in the axial direction in the exchanger region. On the first or the second base, a diffuser may be arranged to supply an exhaust gas stream. Through the tubes arranged in the housing, a first fluid can flow during operation of the heat exchanger, preferably a coolant.

Outside of the tubes, a second fluid, for example, an exhaust gas flow to be cooled, can flow through the housing.

The tubes and the base can be cast from a thermally stable, particularly high temperature resistant material, for example, made of a metal. Due to the arrangement of the metallic element in areas of the housing inner surface, it is possible that at least a connection between one of the bases and one of the tube ends can be made, after tubes at least partially inserted in the base are arranged in the housing.

The connection between tubes and base can be made by means of a joining technique, in particular by means of laser welding. For example, in each case a tube end can be arranged in the first base, for example inserted, thereby creating a tube/base package, the tube/base package can be inserted in the housing, the remaining tube ends are inserted in the second base and the tube ends are welded to the respective bases.

In the inventive method for producing a heat exchanger with an exchanger region with tubes, which are flowed through by a fluid, comprising a housing in which the exchanger region is arranged, and bases, in a first method step at least one tube end of the tubes is inserted into at least one of the bases, and in a second method step, a non-releasable, in particular solid tube-base connection, is produced with a connection technique.

The non-releasable connection cannot be easily separated by a reversal of the connection or joining process. The non-releasable connection may be a solid compound which is separable only by destruction. Preferably, the connection is a cohesive connection. For example, the connection technique can be a joining method, preferably a laser welding process or a brazing process. The tube-base connection can be made at one end of the tube/base package when the latter is disposed in the housing, or on both sides of the tube/base package. Thus, a heat exchanger having a plastic housing can be easily and inexpensively manufactured, in particular an i-flow heat exchanger. In particular, the tube/base connection can be made without the need for costly intermediate elements as in the prior art. For example, the metallic element can be disposed respectively at the points at which scattered light could occur during laser welding of the tubes into the base. The metallic elements can be arranged at the open ends of the housing into which the tube/base unit is inserted. Thus, the area of the housing which is arranged in the immediate vicinity of the tube/base junction is protected from scattered laser light.

A singular or a plurality of metallic elements can be arranged on at least one housing inner surface in which the metallic element/s is/are poured into the plastic of the housing. The heat exchanger can have an area for receiving a base or an area of the housing directly adjacent to a base, wherein at least the at least one metallic element can be disposed on one of the housing inner surfaces. The at least one metallic element may have an annular cross section and the outer surfaces of the metallic element may simulate the inner surface of the housing. Here, in particular, a closed form of the metallic element is ensured due to the annular cross section. The annular cross section may in this case be circular. The metallic element may have straight sections as well as rounded corners, and may have a more rectangular shape with rounded corners, and with this geometric configuration may ensure a closed cover of the housing inner surface.

In an embodiment, the at least one metallic element may have an at least partially encircling angled edge region. For example, the at least partially encircling angled edge region can form a stop against the housing.

The at least one metallic element can be formed in two parts, wherein the division can be produced by separating cuts on two opposite surfaces of the metallic element. The inlay hereby can have an inlay element at least partially enveloping, for example, a top and one or two lateral housing inner surfaces, and a second inlay element at least partially enveloping, for example, a lower housing inner surface. Between the first inlay element and the second element, a dividing line can be formed on the lateral housing inner surfaces. However, the dividing line can also be arranged on the upper and/or lower housing inner surface. This more easily allows for the inner surface of an asymmetrical housing to be enveloped by the metallic element, in particular, by the inlay.

The at least one metallic element can be an inlay. The inlay can be at least in parts made of metal. The inlay may be co-injected in the plastic housing. This is advantageous if the plastic housing is an injection molded part. However, the inlay can also be manufactured as a separate component and be subsequently arranged in the housing.

In an embodiment of the heat exchanger, the inlay is integrally formed. At one or both ends of the housing, the inlay can be inserted in the latter or formed thereon.

The at least one metallic element can be formed as a metallic coating of the housing, for example, the inner surface of the housing. Coatings, especially metallic coatings, can be designed thin. They can also be easily applied to the inner surface of the housing by means of generally known coating processes. The metallic coating is particularly suitable for complicated shapes of the housing inner surface.

In an embodiment of the heat exchanger, the at least one metallic element can completely cover the inner surface of the housing. The metallic element in this case can extend inside from a first housing end to a second housing end. For example, the coating can be implemented throughout. Alternatively, the metallic element can completely cover the dimensions of the housing inner surface in the longitudinal direction. However, this way the metallic element can cover the periphery of the housing inner surface only in some areas.

The housing of the heat exchanger can be a 2-component plastic part.

The object is also achieved by a motor vehicle with at least one heat exchanger, wherein the exchanger region with tubes is welded on both sides, in each case with a base, after said region has already been arranged in the plastic housing. Here, no intermediate elements are necessary to facilitate the weld. By doing without intermediate elements according to the method of the invention, weight can be reduced. In addition, a weight-reduced i-flow heat exchanger with two bases (one base per housing side) and made of lightweight plastic can be used.

The heat exchanger can be an exhaust gas heat exchanger.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
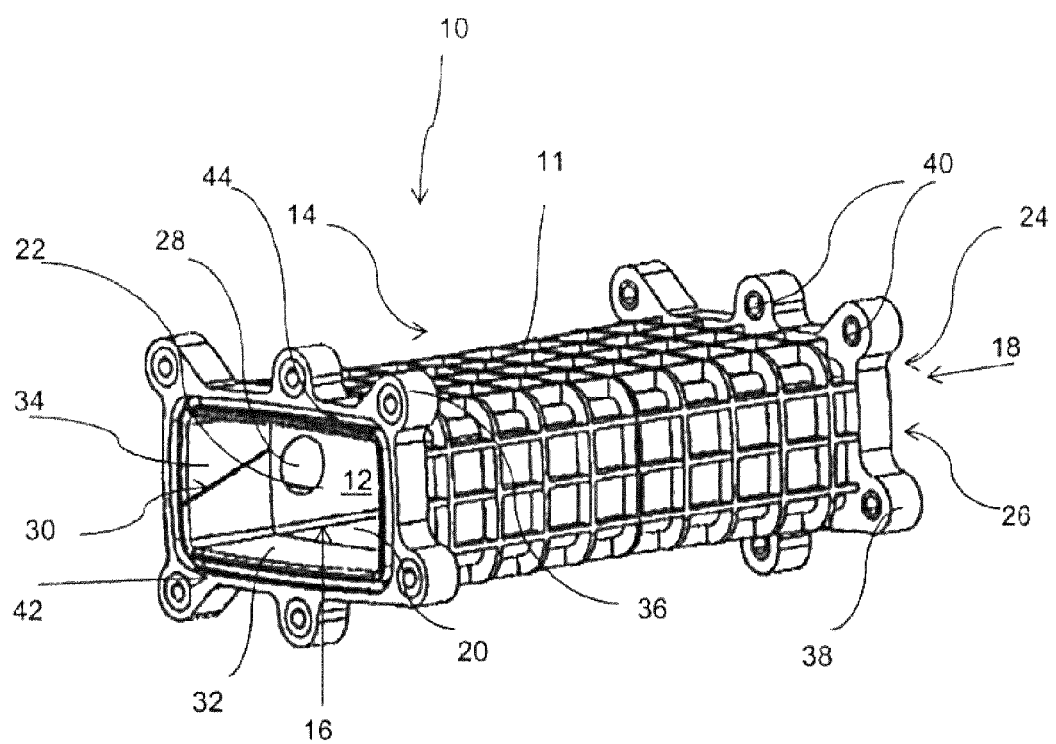
FIG. 1 is a housing of an i-flow heat exchanger according to an exemplary embodiment.

FIG. 1 shows an exemplary embodiment of a housing 10 of a heat exchanger in a perspective side view looking into the housing interior 12. The housing 10 is made of a plastic material and preferably produced by injection molding. The housing 10 is constructed as i-flow housing 10 and has an elongated case body 14, which is formed by a housing jacket 11 made of plastic and on the front side has a first opening 16 and a second opening 18.

The interior of the housing 12 has four substantially planar housing inner surfaces 20, 22, 24 and 26. The housing inner surfaces 20 and 24 and the housing inner surfaces 22 and 26 are situated opposite one another.

On the housing inner surface 22, a recess 28 is shown to which a connector can be connected for supplying a fluid.

On the housing inner surfaces 20, 22, 24 and 26, an inlay 30 is arranged, having a first inlay element 32 and a second inlay element 34. The inlay 30 is constructed of two parts. The inlay 30 may in this case be a two-part design (as shown in FIG. 1) or a 3-part or generally multi-part design and have the appropriate number of inlay elements. The inlay 30 or inlay elements 32, 34 are formed by a metallic element 30 or by a plurality of metallic elements 32, 34. The term inlay 30 or inlay element 32, 34 is hereinafter referred to as equivalent to the term metallic element 30, 32, 34.

Preferably, the inlay element 30 which forms the metallic element 30 is designed as an annular body. The curve of the outer surfaces of the annular body is modeled after the shape of the housing inner surfaces 20, 22, 24, 26. The annular body can thus be applied in full surface contact at the housing inner surfaces 20, 22, 24, 26. The annular body may in this case either be inserted through one of the openings 16, 18, or encapsulated by the material forming the housing 10 during the manufacturing process of the housing 10. For this purpose, the inlay 30 or the inlay elements 32, 34 can be advantageously inserted into the mold of the housing 10 and then be encapsulated with the material forming the housing 10.

The inlay 30 or the inlay elements 32, 34 preferably have an at least partially encircling edge region, which is angled relative to the region forming the annular body. The angled edge portion forms a stop against the housing 10 and in particular against the respective flange regions 36, 38 at the openings 16, 18 of the housing 10. Due to the angled edge region, the depth of insertion of the inlay 30 and inlay elements 32, 34 is limited.

The inlay 30, 32, 34 lines the housing inner surfaces 20, 22, 24, 26 in the embodiment in the region of the openings 16 and 18. The dimensions of the inlay 30, 32, 34 can, however, also correspond to the dimension in the longitudinal extension of the housing body 11 and extend from the opening 16 to the opening 18. The inlay 30, 32, 34 may be a separate metallic element or be designed as a coating of the housing inner surfaces 20, 22, 24 and 26. Here, at least in the region of the openings 16 and 18, the housing inner surfaces 20, 22, 24 and 26 are covered by a metallic material. Preferably, the metallic element 30, 32, 34 extends a few centimeters from the respective opening 16 and 18 into the housing interior 12.

The housing 10 on both sides has a flange each, these are connecting flanges 36 and 38. The flanges 36 and 38 have recesses 40. Further, the housing 10 has a sealing groove 44 at its front end 42.

Figure 2:
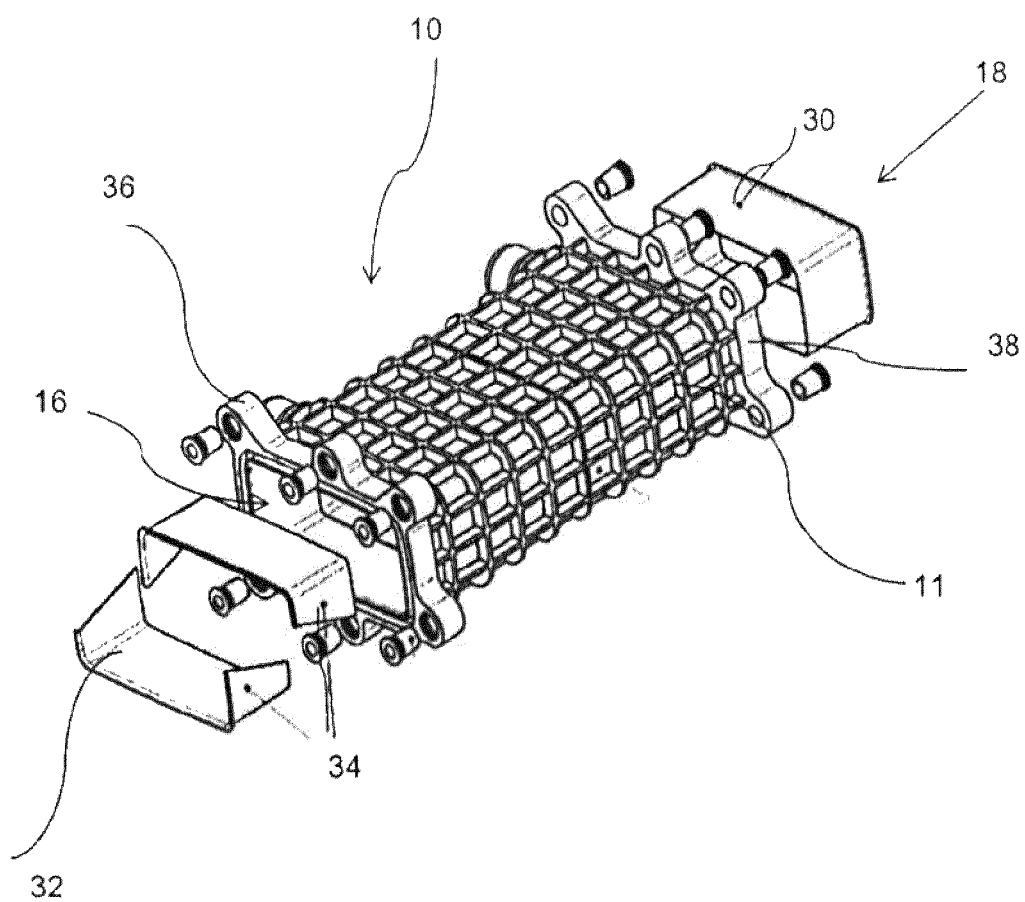
FIG. 2 shows the housing with associated inlays.

FIG. 2 shows the housing 10 in an exploded view. The metallic element 30, 32 and 34, designed here exemplified as a one-piece inlay 30 as two inlay elements 32 and 34, is respectively disposed outside the housing body 14 and may be inserted in the interior of the housing 12 along the housing inner surfaces 20, 22, 24 and 26.

The separation of the metallic element 30 into two or more elements 32, 34 is advantageously realized by separating cuts, which extend at substantially opposing surfaces of the metallic element 30, 32, 34. The cuts may in this case run parallel to each other or, as shown in FIG. 2, be inclined in opposite directions to each other. This opposite orientation of the cuts prevents a shifting of the individual elements 32, 34 against each other.

Figure 3:
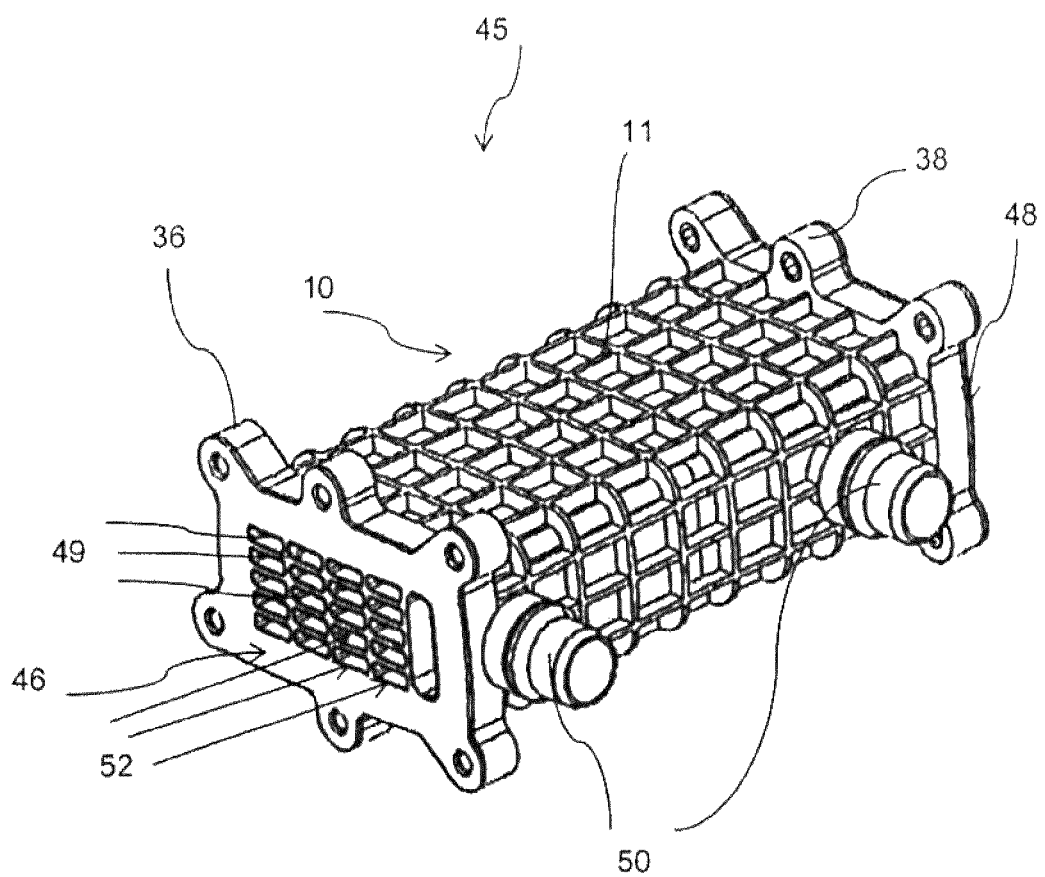
FIG. 3 is the housing with the assembled tube/base package.

FIG. 3 shows a heat exchanger 45 with the housing 10 in the assembled state. On the housing 10, a first base 46 and a second base 48 are mounted at the respective connecting flange 36 and 38. In the first base 46 and the second base 48, tubes 49 are arranged, particularly plugged in and integrally connected to the respective base, in particular welded or soldered, preferably connected by a laser welding method, in particular non-releasably connected. At the opening 28, a connector 50 is mounted through which a fluid, in particular gaseous fluid, can enter the interior of the housing 12 and can flow between the tubes 49, through which a cooling fluid can flow.

The method for producing the heat exchanger thus can have the steps of: Producing a housing body 11 made of a plastic material, preferably by means of an injection molding process; Producing a metallic element 30, 32, 34 at least in the region of the two end openings 42 at the housing inner surfaces 20, 22, 24 and 26; Arranging the tube-base package, in which in each case at least one tube end of the tubes 49 is inserted in each case in openings 52 of the at least one base 46 or 48; Optional: arranging the second base 46 or 48 when the tube/base package is disposed in the housing body 14; and Welding, in particular by means of laser welding, of the respective tube ends of the tubes 49 to the respective base 46, 48.

After the core of the heat exchanger 45 composed of the housing 10 and the tube/base package is mounted, the heat exchanger 45 can be installed in a motor vehicle (not shown), and connecting elements can be connected to the connectors 50 for a gaseous fluid, and tubes 49 can be connected to the cooling fluid circuit.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A heat exchanger comprising:
    a housing having a first opening at a first end and a second opening at an opposing second end;
    an exchanger region disposed in the housing with tubes that extend from the first opening to the second opening; and
    at least one base attached to the housing at either the first opening or the second opening,
    wherein ends of the tubes are connectable with the at least one base,
    wherein the housing is manufactured from a plastic material and has housing inner surfaces, and
    wherein the housing inner surfaces are covered at least in regions or in sections with at least one metallic element for protection of the housing from a thermal load,
    wherein the at least one metallic element extends into the housing starting from an edge of either the first opening or the second opening.

2. The heat exchanger according to claim 1, wherein a singular or a plurality of the at least one metallic element is provided on at least one of the housing inner surfaces, wherein the singular or the plurality of the at least one metallic element are molded into the plastic of the housing.

3. The heat exchanger according to claim 1, wherein an area receiving the at least one base and an area of the housing directly adjacent to the at least one base, has the at least one metallic element on one of the housing inner surfaces.

4. The heat exchanger according to claim 1, wherein the at least one metallic element has an annular cross section and outer surfaces of the metallic element simulate an inner surface of the housing.

5. The heat exchanger according to claim 1, wherein the at least one metallic element has an at least partially encircling angled edge region.

6. The heat exchanger according to claim 5, wherein the at least partially encircling angled edge region forms a stop against the housing.

7. The heat exchanger according to claim 1, wherein the at least one metallic element is formed in two parts, and wherein a division of the at least one metallic element into the two parts is produced by separating cuts on two opposite surfaces of the at least one metallic element.

8. The heat exchanger according to claim 1, wherein the at least one metallic element is an inlay.

9. The heat exchanger according to claim 8, wherein the inlay is formed in one piece or several pieces.

10. The heat exchanger according to claim 1, wherein the at least one metallic element is a metallic coating on at least one of the housing inner surfaces.

11. The heat exchanger according to claim 1, wherein the at least one metallic element completely covers the housing inner surfaces.

12. The heat exchanger according to claim 1, wherein the housing is a 2-component plastic part.

13. A method for producing a heat exchanger having an exchanger region with tubes which are flowed through by a fluid, a housing in which the exchanger region is arranged, the housing having a first opening at a first end and a second opening at an opposing second end, the tubes extending from the first opening to the second opening, and bases attached to the housing at the first opening and the second opening, respectively, the method comprising:

- covering, in a first method step, housing inner surfaces, at least in regions or in sections, with at least one metallic element so that the at least one metallic element extends into the housing starting from an edge of either the first opening or the second opening for protection of the housing from a thermal load;
- inserting at least one tube end of the tubes in a second method step in at least one of the bases; and
- producing a non-releasable or solid tube-base connection in a second third method step with a connection technique.

14. The method according to claim 13, wherein the connection technique is a laser welding process.

15. A motor vehicle with at least one heat exchanger, which is produced by a method according to claim 13.

16. The heat exchanger according to claim 1, wherein the housing further includes a first flange region that surrounds the first opening at the first end and a second flange region that surrounds the second opening at the second end, wherein the at least one base includes a first base connected to the first flange region and a second base connected to the second flange region.

17. The heat exchanger according to claim 1, wherein the at least one base and the tubes are formed of metal.

18. The heat exchanger according to claim 7, wherein the separating cuts are provided at an angle to an axial direction of the tubes extending from the first opening to the second opening.

* * * * *